July 13, 1943.                A. TROSCH                 2,324,180
                              BORING MILL
                       Filed Jan. 17, 1942          2 Sheets-Sheet 1
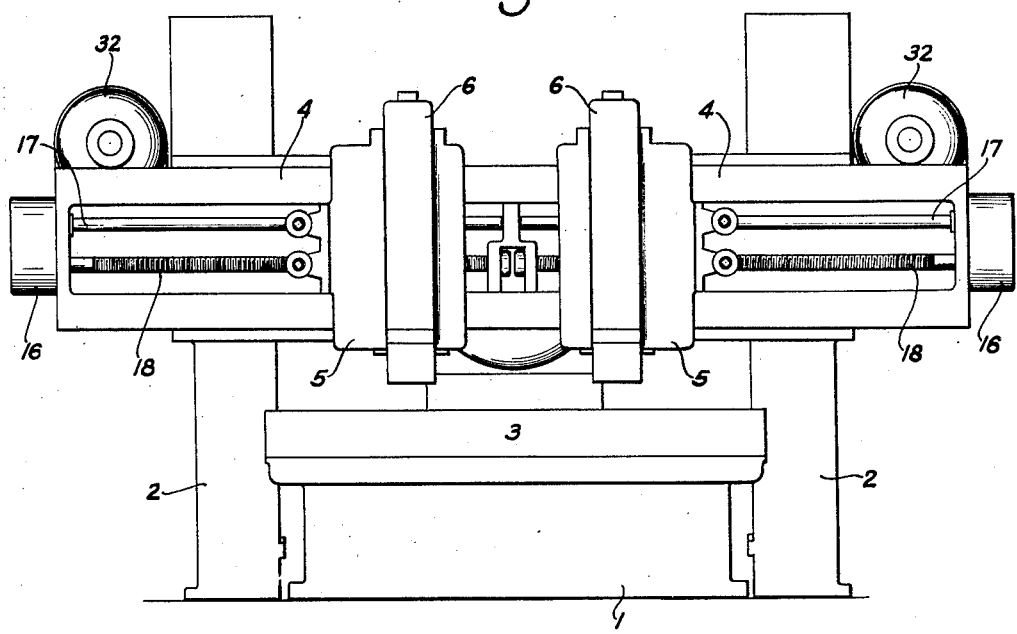
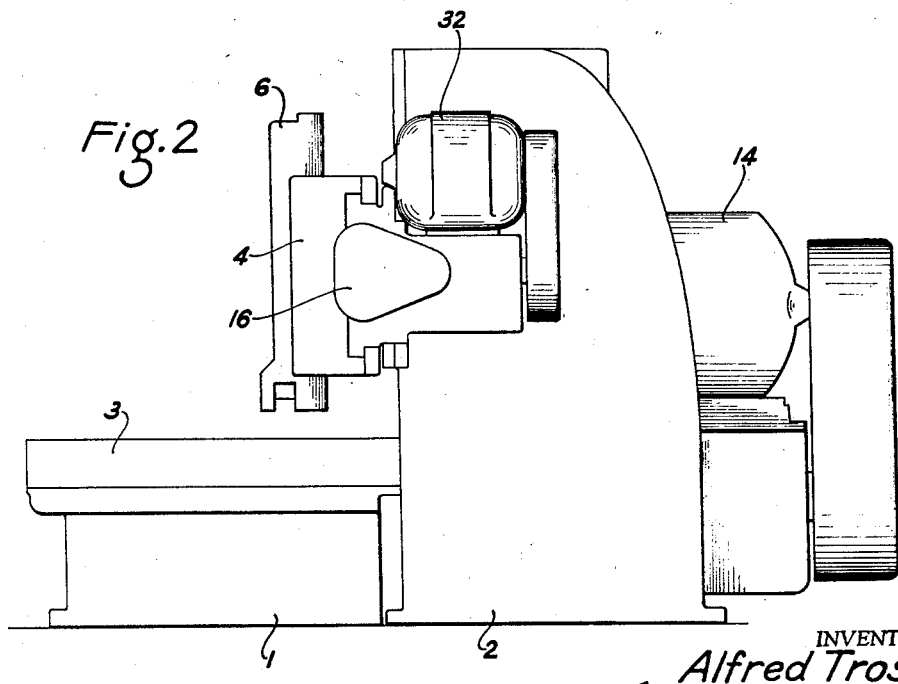
INVENTOR.
Alfred Trosch
BY Harold E. Stonebraker,
ATTORNEY.

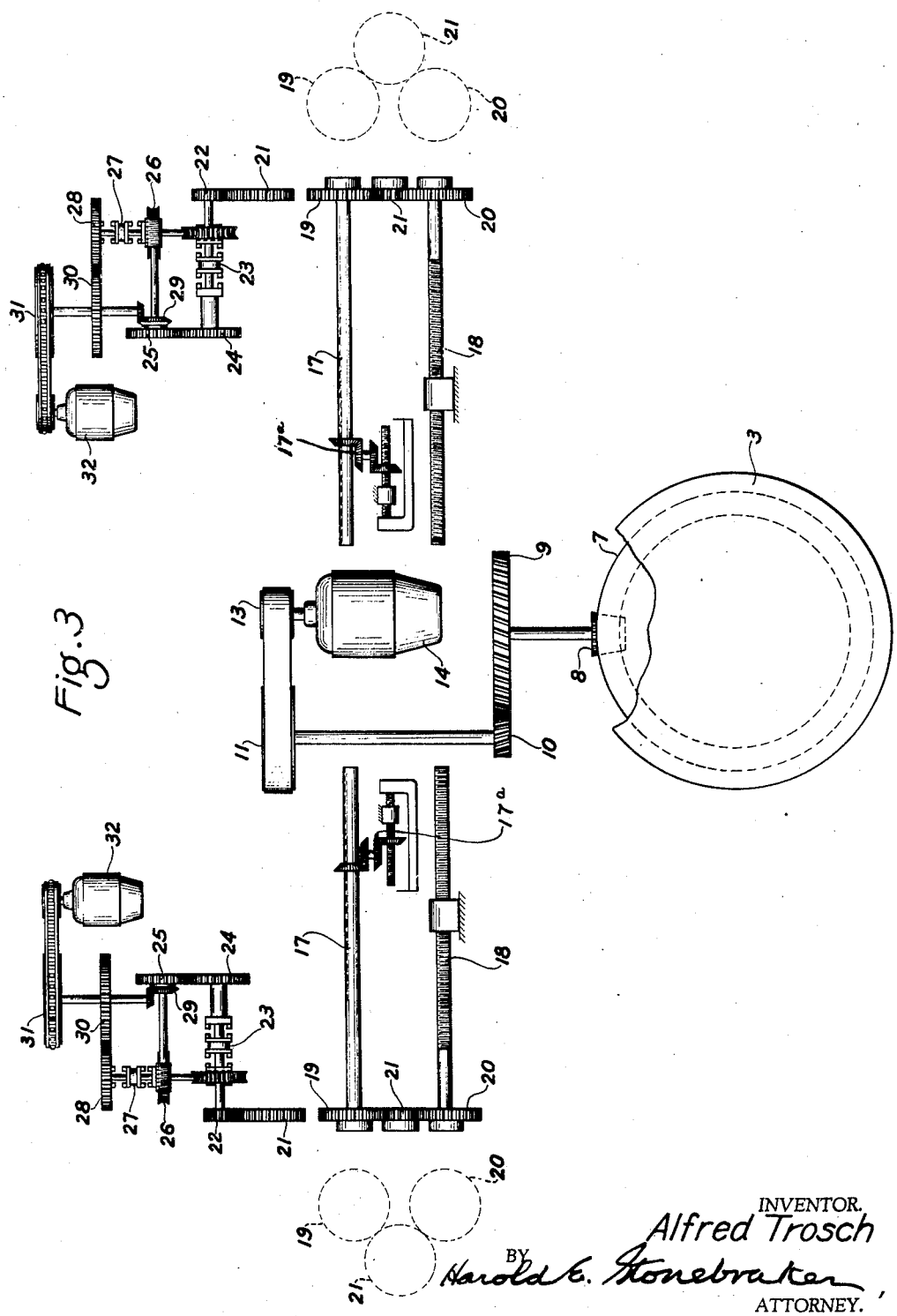

Patented July 13, 1943

2,324,180

UNITED STATES PATENT OFFICE 2,324,180

BORING MILL

Alfred Trosch, Brighton, N. Y., assignor to Consolidated Machine Tool Corporation, Rochester, N. Y., a corporation of Delaware Application January 17, 1942, Serial No. 427,146

11 Claims. (Cl. 77—4)

This invention relates to a boring mill, with particular reference to the type of machine adapted for boring, turning, and facing parts of large castings and forgings, and embodying a rotatable work table located in a horizontal plane and turning about a vertical axis together with tool heads that are fed horizontally on a cross-rail and may include tool-supporting rams that are fed vertically, and it has for its object to afford a boring mill that is more flexible and easier to operate, through independent control of the table speed and tool feed, making it possible to change either the speed of the table or the rate of movement of the tool independently of, and without affecting the other and so facilitating a wider range of operation and enabling less experienced operators to attain satisfactory results without the degree of skill that has heretofore been necessary.

Another purpose of the invention is to provide a boring mill comprising fewer parts and of simpler construction than heretofore, which can be manufactured and assembled in much less time than required by prior machines designed for similar work.

A further purpose of the invention is to afford a machine that can be operated faster than boring mills as heretofore constructed, by enabling changing the tool feed without stopping the machine and permitting an operator to control both the speed of the table and the rate of tool feed within practical ranges from a common point without having to move to the ends of the machine for manipulation of control levers, and by reducing the number of parts to provide a mechanism that requires less servicing and maintenance or repair than with the old type of boring mill.

In the old type vertical boring mill, the feed mechanism is operated by the same motor that drives the work table through necessary shafting and gearing which requires many more parts and considerable additional time in machining and assembling them, and it also has the further disadvantage that the feed of the tool is always in direct relation to the speed of the work table since these parts are driven from the same power source, and it is a particular object of the invention to afford an arrangement in which the work table is driven from one motor or power source and the feed mechanism is operated from a separate motor or power source so that by varying the speed of one motor, the speed of the work table or the rate of movement per minute of the tool may be adjusted without changing or affecting the other, such result being attainable by variable speed electric motors separate from each other and operatively connected to the table and feed mechanism respectively, permitting a change in finish, chip section, or table speed, without any variation in the rate of tool movement or amount of metal removed per minute.

To these and other ends, the invention consists in the construction and arrangement of parts that will appear clearly from the following description, when read in conjunction with the accompanying drawings, the novel features being pointed out in the claims following the specification.

In the drawings:

Fig. 1 is a front elevation of a machine constructed in accordance with a preferred embodiment of the invention;

Fig. 2 is a side elevation, and

Fig. 3 is a diagrammatic view of the drive from the separate motors to the work table and feed mechanisms.

In the prior types of vertical boring mill where the work table and feed mechanism are driven from the same power source and geared together, it is necessary to shift gears or clutches for all speed changes, requiring that the operator go to one end of the machine and make such shifts at one end of the cross-rail, and where desirable to change the feed while cutting, it is necessary first to disengage the feed mechanism and in most cases, stop movement of the table all of which requires much time and slows down production appreciably. As compared with this prior practice, in the machine of the invention, the operator can increase or decrease the speed of the table drive motor or of the feed mechanism motor from a single control point by operation of suitable electric control units and the rate of tool movement can be varied without stopping the work table, thus effecting a substantital saving in time and materially enhancing the efficiency of the machine.

Another serious disadvantage of the old type vertical boring mill lies in the fact that the tool feed is always in predetermined relation to the number of turns of the work table per minute whereas with the present invention, the rate of movement of the tool is any selected distance per minute irrespective of the number of turns per minute of the work table. With the old type machine, an increase in speed of the work table affects a corresponding change in the feed which is always in a fixed relation to a given number of turns of the work table. Consequently an increase in speed of the work table results in an increase in the amount of metal removed per minute and imposes a correspondingly greater burden on the cutting tool and machine. A change in feed in the old type machine increases or decreases the amount of metal removed per minute, but the selection of a particular feed determines and fixes the chip section which depends upon the amount of tool movement for each turn of the work table and cannot be changed except by changing the feed.

Since the burden imposed on the cutting tool and machine depends on the amount of metal removed per minute rather than the size of the chip, it is desirable to make it possible to feed the tool any selected distance per minute without affecting the speed of the work table, so that table speed may be altered to suit conditions without substantially affecting the amount of metal removed per minute and consequently without substantially varying the burden on the cutting tool or machine.

With the present invention, the speed of the work table can be increased without changing the rate of movement of the tool, and this has the effect of lessening the size of the chip section and improving the finish without increasing the amount of metal removed per minute. The rate of movement of the tool per minute is the only factor governing the amount of metal removed per minute, whereas with the old type machine, the chip section remains the same upon increasing the table speed, so that it is impossible to obtain the benefit of an improved finish resulting from higher table speed without correspondingly increasing the amount of metal removed per minute.

This is a serious disadvantage and handicap, as for instance when a hard spot in the work is reached, and it is impossible to slow down the tool feed without correspondingly decreasing the table speed, and it is also impossible to obtain the best finish due to a proper table speed without correspondingly increasing the amount of metal removed per minute and imposing too great a burden on the machine.

All these obstacles are removed by the present invention in which the table and feed mechanism are driven from independent power sources and are not geared together so that the rate of movement of the tool per minute is the only factor governing the amount of metal removed per minute.

Thus the operator after selecting the proper rate of tool movement and adjusting the feed mechanism motor accordingly can obtain any desired finish or adapt the cutting to the requirements or characteristics of the work by suitably varying the table speed. This result cannot be accomplished with the old type machine, and it is possible with the invention to control any cutting operation to a nicety in a simple manner which enables a less experienced operator to obtain results comparable or superior to the work produced on the old type machine by operators with long experience.

Referring more particularly to the drawings, in which like reference numerals refer to the same parts throughout the several views, I designates the base of the frame which includes uprights 2, and 3 is the work table mounted on the base I and adapted to be rotated in a horizontal plane about a vertical axis, as usual in this type of machine, while 4 is the cross-rail secured to the uprights 2 and provided with the tool heads 5.

The tool heads 5 are mounted upon the cross-rail 4 for horizontal movement thereon, and 6 designates a ram mounted on each tool head for vertical travel and adapted to receive the cutting tool, not shown. The parts thus far described are in principle the same as the old type vertical boring mill, and the present invention has to do with the mechanism used for driving the work table and feeding the tool heads and tool-supporting rams which will now be described.

The work table 3 carries a suitable crown gear 7 that is operated by a bevel pinion 8 mounted on a shaft carrying a gear 9 operated by a pinion 10 which in turn is mounted on a shaft carrying a pulley 11 that is driven by a belt from pulley 13 on the shaft of an electric motor 14. The motor 14 which drives the work table is preferably of the variable speed type, and as an example of a practical form of motor for the purpose may be a 40 H. P. unit with a variable speed range of from 250 to 1500 R. P. M. While this is a preferred form of drive for the work table, other types of motive power or driving mechanism may be employed as long as changes in the speed of travel of the work table may be effected without affecting the rate of movement of the tool or the amount of metal removed per minute.

The tool heads 5 are controlled by separate, independent feeding mechanisms located at opposite ends of the cross-rail within the feed boxes 16, and 17 and 18 designate shafts leading from each feed box to the bevel gear drive 17ª which controls the ram 6 and to the head 5 respectively, as usual in this type of machine. Since the driving parts from the feed mechanism to the tool head and ram form no part of the present invention and do not differ in any material respect from the old type machine which is well known to those skilled in the art, it is unnecessary for an understanding of the invention to disclose or describe these parts further.

Both feeding mechanisms are in all respects the same, and it will therefore be necessary to describe in detail only one, in which shafts 17 and 18 carry at their outer ends the gears 19 and 20 arranged to be operated by an intermediate adjustable gear 21 which is driven by a pinion 22, the latter being mounted on a shaft that is operated through the shiftable clutch 23 from the power rapid traverse gears 24 and 25, or from a shaft which carries a worm gear 26, that is operated with two different speed ranges through a shiftable clutch 27 and gear 28 or bevel pinion 29, the drive being derived from the gear 30 mounted on a shaft which carries gear 31 that is operated by a belt from a pulley on the shaft of the variable speed electric motor 32. Each motor 32 is of the reversible type, eliminating the necessity for the use of mechanical reversing instrumentalities and permitting reverse movement of the feed motor without affecting movement of the table. Each motor 32 is preferably of a type embodying direct current voltage and field control by means of a motor generator set and suitable rheostats, and designed to permit minimum speed range of twenty to one, and preferably from 49 to 1700 R. P. M. so that no change speed gears are required except where an unusually wide feed range is desirable, in which instance there may be a high and low speed range selectively controlled by a clutch 27, as shown in Fig. 3 and as described above.

Since the feeding mechanisms are independently controlled from separate sources of power, each tool head may be fed at a selected rate of movement controllable independently of the rate of movement of another tool head or of the table speed, and while the use of an electric motor of particular character is indicated herein, it will be understood that other types of motors, electric or otherwise, might be employed within the contemplated purposes of the invention for attaining the desired result of varying the table speed or turns per minute of the work table of a vertical boring mill without affecting the extent of movement per minute of the tool and also changing the rate of tool movement without stopping or modifying movement of the table.

While the invention has been described with reference to the particular embodiment shown, it is not confined to the details or arrangement herein disclosed, and this application is intended to cover such further modifications or changes as may come within the purposes of the invention and the scope of the following claims.

I claim:

1. In a boring mill, the combination with a work table rotatable in a horizontal plane about a vertical axis, a gear mounted on the work table, a pinion engaging said gear, an electric motor, speed reduction gearing connecting said electric motor with said pinion for driving the table at low speeds, a cross-rail, a tool head mounted on the cross-rail for movement thereon, and feeding means controlling the movement of the tool head, of a separate electric motor operatively connected to said feeding means and effecting the feed movement of the tool head, said last mentioned motor being independent of the first mentioned motor connected to the work table whereby the tool head may be fed at a rate of movement independent of the table speed.

2. In a boring mill, the combination with a work table rotatable in a horizontal plane about a vertical axis, a gear mounted on the work table, a pinion engaging said gear, an electric motor, speed reduction gearing connecting said electric motor with said pinion for driving the table at low speeds, a cross-rail, a plurality of tool heads mounted on the cross-rail for movement thereon, of separate feeding means for the tool heads, and a separate electric motor operatively connected to each feeding means and effecting the feed movement of a tool head, said last mentioned motors being independent of the first mentioned motor connected to the work table whereby the tool heads may be separately fed at different rates of movement independent of the table speed.

3. In a boring mill, the combination with a work table rotatable in a horizontal plane about a vertical axis, a gear mounted on the work table, a pinion engaging said gear, an electric motor, speed reduction gearing connecting said electric motor with said pinion for driving the table at low speeds, a cross-rail, a tool head mounted on the cross-rail for movement thereon, a tool supporting ram movable vertically in the tool head, and feeding means controlling movement of the tool head on the cross-rail and the vertical travel of the ram in the tool head, of a separate electric motor operatively connected to said feeding means and effecting the feed movements of the tool head and ram, said motor being independent of the first mentioned motor connected to the work table whereby the tool head and ram may be fed at a rate of movement independent of the table speed.

4. In a boring mill, the combination with a work table rotatable in a horizontal plane about a vertical axis, a gear mounted on the work table, a pinion engaging said gear, an electric motor, speed reduction gearing connecting said electric motor with said pinion for driving the table at low speeds, a cross-rail, a tool head mounted on the cross-rail for movement thereon, and feeding means controlling the movement of the tool head, of a variable speed electric motor operatively connected to said feeding means and effecting the feed movement of the tool head, the last mentioned motor being independent of the first mentioned motor connected to the work table whereby the tool head may be fed at a rate of movement independent of the table speed.

5. In a boring mill, the combination with a work table rotatable in a horizontal plane about a vertical axis, a gear mounted on the work table, a pinion engaging said gear, speed reduction gearing operating said pinion, a cross-rail, a tool head mounted on the cross-rail for movement thereon, and feeding means controlling movement of the tool head, of separate variable speed electric motors operatively connected to said speed reduction gearing and to said feeding means respectively permitting independent control of the speed of the table and feed rate of the head per unit of time.

6. In a boring mill, the combination with a work table rotatable in a horizontal plane about a vertical axis, a gear mounted on the work table, a pinion engaging said gear, a variable speed electric motor, speed reduction gearing connecting said motor with said pinion for driving the table at low speeds, a cross-rail, a plurality of tool heads mounted on the cross-rail for movement thereon, of separate feeding means for the tool heads, and a separate variable speed electric motor operatively connected to each feeding means and effecting the feed movement of a tool head, said last mentioned motors being separate from the first mentioned motor connected to the work table whereby the tool heads may be separately fed at different rates of movement independent of the table speed.

7. In a boring mill, the combination with a work table rotatable in a horizontal plane about a vertical axis, a gear mounted on the work table, a pinion engaging said gear, an electric motor, speed reduction gearing connecting said electric motor with said pinion for driving the table at low speeds, a cross-rail, a plurality of tool heads mounted on the cross-rail for movement thereon, of separate feeding means controlling the tool heads, and separate variable speed electric motors operatively connected to said feeding means and effecting the feed movement of a tool head, the last mentioned motors being separate from the motor connected to the work table permitting feeding of the tool heads separately at rates of movement independent of the table speed.

8. In a boring mill, the combination with a work table rotatable in a horizontal plane about a vertical axis, a gear mounted on the work table, a pinion engaging said gear, speed reduction gearing operating said pinion, a cross-rail, a tool head mounted on the cross-rail for movement thereon, feeding means controlling the feed movement of the tool head, of separate electric driving means for the reduction gearing and feeding means permitting selecting a rate of movement of the tool head in inches per minute independently of the table speed.

9. In a boring mill, the combination with a work table rotatable in a horizontal plane about a vertical axis, a gear mounted on the work table, a pinion engaging said gear, a variable speed electric motor, speed reduction gearing connecting said electric motor with said pinion for driving the table at low speeds, a cross-rail, a plurality of tool heads mounted on the cross-rail for movement thereon, and separate feeding means for each tool head, of an independent variable speed electric motor for each of said feeding means, the last mentioned motors being separate from the first mentioned motor connected to the work table and being adjustable in speed over a minimum of twenty to one range.

10. In a boring mill, the combination with a work table rotatable in a horizontal plane about a vertical axis, a gear mounted on the work table, a pinion engaging said gear, a variable speed electric motor, speed reduction gearing connecting said electric motor with said pinion for driving the table at a low speeds, a cross-rail, a plurality of tool heads mounted on the cross-rail for movement thereon, a tool supporting ram movable vertically on the tool head, and separate feeding means controlling movement of each tool head on the cross-rail and the vertical travel of the ram on the tool head, rapid traverse mechanism for each tool head and ram, of an independent variable speed electric motor for each of said feeding means and rapid traverse mechanism, the last mentioned motors being separate from the first mentioned motor connected to the work table permitting the tool heads and rams to be separately fed at rates of movement independent of the table speed.

11. In a boring mill, the combination with a work table rotatable in a horizontal plane about a vertical axis, a gear mounted on the work table, a pinion engaging said gear, speed reduction gearing operating said pinion, a cross-rail, a tool head mounted on the cross-rail for movement thereon, and feeding means controlling the feed movement of the tool head, of separate electric motors operatively connected to said speed reduction gearing and feeding means respectively whereby a change in table speed does not affect the amount of metal removed per minute.

ALFRED TROSCH.